(12) United States Patent
Takahashi et al.

(10) Patent No.: US 9,188,042 B2
(45) Date of Patent: Nov. 17, 2015

(54) UREA QUALITY DIAGNOSIS SYSTEM

(75) Inventors: Hirotaka Takahashi, Fujisawa (JP);
Takeshi Fukuoka, Fujisawa (JP);
Tomoyuki Itou, Fujisawa (JP); Yasuo Okamoto, Fujisawa (JP); Tatsuo Mashiko, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 314 days.

(21) Appl. No.: 13/578,870

(22) PCT Filed: Feb. 23, 2011

(86) PCT No.: PCT/JP2011/053981
§ 371 (c)(1),
(2), (4) Date: Aug. 14, 2012

(87) PCT Pub. No.: WO2011/105425
PCT Pub. Date: Sep. 1, 2011

(65) Prior Publication Data

US 2012/0304744 A1 Dec. 6, 2012

(30) Foreign Application Priority Data

Feb. 26, 2010 (JP) ................................. 2010-042742

(51) Int. Cl.
*F01N 3/20* (2006.01)
*F01N 11/00* (2006.01)

(52) U.S. Cl.
CPC .............. *F01N 3/2066* (2013.01); *F01N 11/00* (2013.01); *F01N 2550/05* (2013.01);
(Continued)

(58) Field of Classification Search
CPC ... F01N 3/2066; F01N 11/00; F01N 2610/02; F01N 3/208; F01N 2560/026; F01N 2900/1818; F01N 2900/1814; F01N 11/002; F01N 11/007; F01N 2610/14; F01N 2900/1812; F01N 2550/05; Y02T 10/47; Y02T 10/24
USPC ....... 73/290 R, 53.01, 61.43, 114.71, 114.72, 73/40, 40.5 R, 864.73; 435/29, 4; 702/25
See application file for complete search history.

(56) References Cited

U.S. PATENT DOCUMENTS 6,063,350 A * 5/2000 Tarabulski et al. ......... 423/239.1
7,842,267 B2 * 11/2010 Nishina et al. ............... 423/237
(Continued)

FOREIGN PATENT DOCUMENTS

EP 2 072 772 A1 6/2009
EP 2 136 045 A1 12/2009
(Continued)

OTHER PUBLICATIONS

PCT Search Report for PCT Serial No. PCT/JP2011/053981 dated May 9, 2011.
(Continued)

*Primary Examiner* — Hezron E Williams
*Assistant Examiner* — Marrit Eyassu
(74) *Attorney, Agent, or Firm* — McCormick, Paulding & Huber LLP

(57) ABSTRACT

A urea quality diagnosis system capable of accurately diagnosing the quality of an aqueous urea solution in a urea tank. A concentration and a level (L) of an aqueous urea solution inside a urea tank 16 are detected, and the quality of the aqueous urea solution is diagnosed based on a detected value of the concentration of the aqueous urea solution when the level L is equal to or higher than a predetermined value.

4 Claims, 2 Drawing Sheets

(52) U.S. Cl.
CPC ........ *F01N 2610/02* (2013.01); *F01N 2610/14* (2013.01); *F01N 2900/1812* (2013.01); *F01N 2900/1818* (2013.01); *Y02T 10/24* (2013.01); *Y02T 10/47* (2013.01)

(56) References Cited

U.S. PATENT DOCUMENTS

| 8,307,699 | B2* | 11/2012 | Sawada et al. | 73/114.75 |
| 2007/0113625 | A1* | 5/2007 | Sasanuma et al. | 73/61.46 |
| 2007/0193345 | A1* | 8/2007 | Yamamoto et al. | 73/61.41 |
| 2009/0193793 | A1* | 8/2009 | Matsunaga | 60/287 |
| 2010/0011748 | A1* | 1/2010 | Yokota | 60/286 |
| 2010/0236220 | A1* | 9/2010 | Nishina et al. | 60/274 |
| 2013/0291617 | A1* | 11/2013 | Boudaoud et al. | 73/1.02 |

FOREIGN PATENT DOCUMENTS

| JP | 2000-027627 | | 1/2000 |
| JP | 2002371831 | A | 12/2002 |
| JP | 2005-083223 | | 3/2005 |
| JP | 2006090334 | A | 4/2006 |
| JP | 2007-047006 | | 2/2007 |
| JP | 2008-095601 | | 4/2008 |
| JP | 2008095601 | A * | 4/2008 |
| JP | 2010007568 | A | 1/2010 |

OTHER PUBLICATIONS

European Search Report for EP Application No. 11747385.0 dated Dec. 11, 2014.

* cited by examiner

UREA QUALITY DIAGNOSIS SYSTEM

CROSS REFERENCE TO RELATED APPLICATIONS

This application is entitled to the benefit of and incorporates by reference essential subject matter disclosed in International Patent Application No. PCT/JP2011/053981 filed on Feb. 23, 2011 and Japanese Patent Application No. 2010-042742 filed Feb. 26, 2010.

TECHNICAL FIELD

The present invention relates to an SCR system that reduces NOx in engine exhaust gas by using an aqueous urea solution and, in particular, to a urea quality diagnosis system for diagnosing a quality such as a concentration of an aqueous urea solution that is injected to an SCR apparatus.

BACKGROUND ART

In order to purify NOx in the exhaust gas of a diesel engine, for example, an SCR system that uses a selective reduction catalyst (SCR) is developed as an exhaust gas purification system (for example, refer to Japanese Patent Application Laid-open No. 2000-27627 and Japanese Patent Application Laid-open No. 2005-83223).

In the SCR system, urea is used as a reductant, an aqueous urea solution is supplied upstream of the exhaust gas of the SCR apparatus, the urea is hydrolyzed by heat of the exhaust gas to generate ammonia, and NOx is reduced by the ammonia on an SCR catalyst to achieve purification.

The aqueous urea solution is stored in a tank, and an injection quantity of the aqueous urea solution injection is calibrated in accordance with an engine speed—load so that a target purification rate can be achieved at a predetermined concentration (for example, 32.5%).

Replenishing the aqueous urea solution may be problematic since dilution of the aqueous urea solution by water may cause a decline in purification performance and, conversely, accidentally adding an aqueous urea solution with a high concentration may cause an ammonia slip due to an oversupply of urea or clogging of an injection nozzle due to urea deposition.

In addition, an increase in concentration due to water evaporation in the urea tank or an increase in concentration due to contamination by a foreign liquid such as a saline solution may conceivably cause a failure in an injection system or the SCR apparatus.

An urea concentration sensor such as that described in Japanese Patent Application Laid-open No. 2007-47006 is provided in the aqueous urea solution tank. The sensor detects and diagnoses a concentration of the aqueous urea solution, and judges that the concentration is abnormal when the concentration is lower or higher than a predetermined value, whereby injection of the aqueous urea solution is prohibited and a warning is issued to an operator to prompt replacement of the aqueous urea solution inside the tank with a normal aqueous urea solution.

DISCLOSURE OF THE INVENTION

However, when a level of the aqueous urea solution in the urea tank is low or, in other words, when a residual quantity of the aqueous urea solution is low, a liquid surface may sway due to a vibration of a vehicle or the like and expose a detecting element of a concentration sensor installed near a bottom surface of the tank. As a result, a problem arises in that signal detection becomes unstable and concentration can no longer be accurately detected.

Therefore, it is an object of the present invention to provide a urea quality diagnosis system capable of solving the problem described above by accurately diagnosing a quality of an aqueous urea solution in a urea tank.

In order to achieve the object described above, the present invention provides a urea quality diagnosis system which detects a concentration and a level of an aqueous urea solution inside a urea tank and which diagnoses a quality of the aqueous urea solution based on a detected value of the concentration of the aqueous urea solution when the level is equal to or higher than a predetermined value.

In the present invention, an abnormal concentration may be diagnosed when a detected value of the concentration of the aqueous urea solution is equal to or higher than an upper limit of the concentration of the aqueous urea solution or equal to or lower than a lower limit of the concentration of the aqueous urea solution.

In the present invention, favorably, a diagnosis based on a detected value of the concentration of aqueous urea solution is not performed when the level is lower than the predetermined value.

In the present invention, when an abnormal concentration is diagnosed, favorably, injection of the aqueous urea solution is prohibited and a warning of the prohibition is issued to an operator.

According to the present invention, since a concentration of an aqueous urea solution in a urea tank is detected by detecting a level and diagnosing a quality based on a concentration detected when the level is equal to or greater than a predetermined value, a beneficial effect can be exerted in that a quality diagnosis can now be performed with accuracy.

BEST MODE FOR CARRYING OUT THE INVENTION

Hereinafter, a preferable embodiment of the present invention will be described in detail with reference to the drawings.

Figure 1:
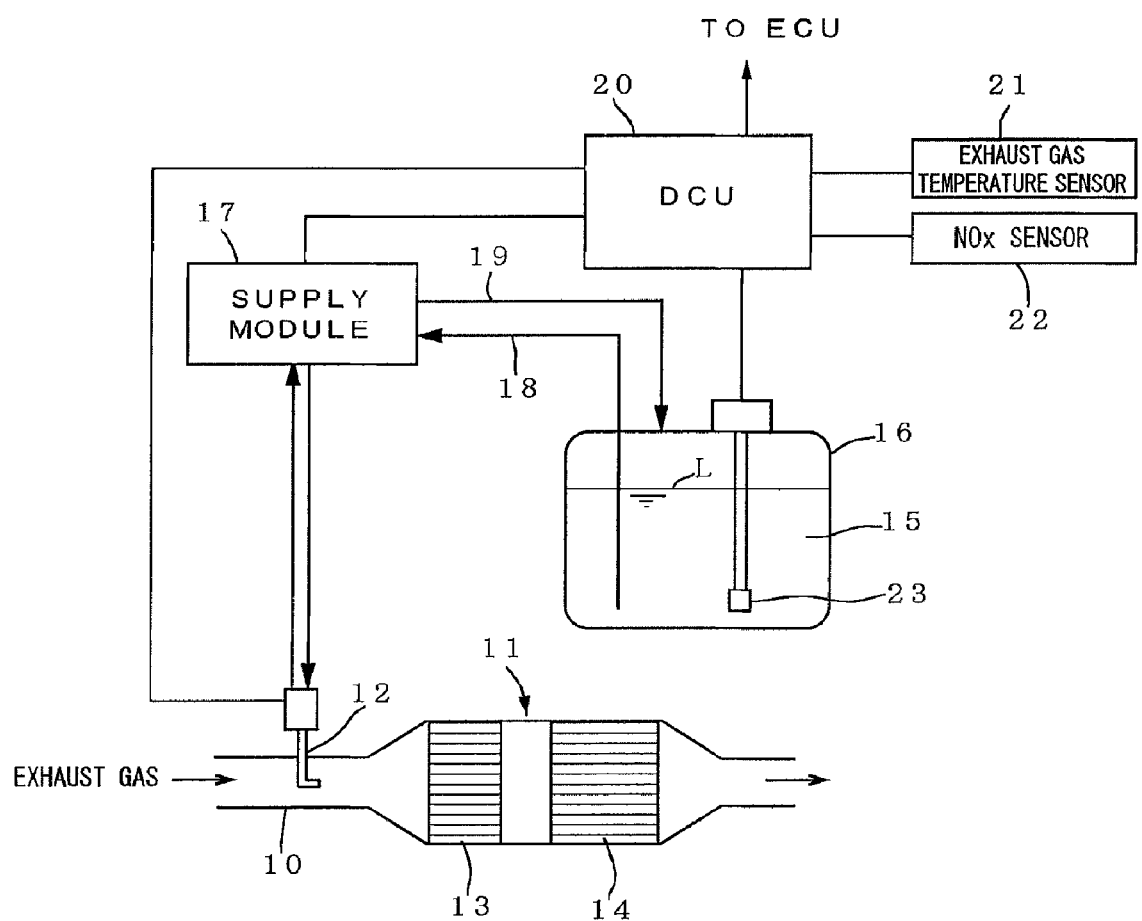
FIG. 1 is a system diagram showing an embodiment of the present invention.

In FIG. 1, an SCR apparatus 11 is connected to an exhaust pipe 10 of a diesel engine, and an injection nozzle 12 that injects an aqueous urea solution is provided on an upstream side of the SCR apparatus 11 to construct an SCR system.

The SCR apparatus 11 comprises an oxidation catalyst layer 13 and a catalyst-loaded ceramic filter 14. The oxidation catalyst layer 13 oxidizes hydrocarbon HC and other unburned matter (SOF) among PM (particulate matter) contained in exhaust gas, and the catalyst-loaded ceramic filter 14 captures the PM in the exhaust gas and also causes ammonia created by pyrolysis of an aqueous urea solution to react with NOx to achieve denitration.

An aqueous urea solution 15 is stored in a urea tank 16. In a supply module 17 comprising a pump, the aqueous urea solution 15 in the urea tank 16 is siphoned through a solution feed line 18 and supplied to the injection nozzle 12 for injection. Residual aqueous urea solution is returned to the urea tank 16 through a recovery line 19.

A quantity of aqueous urea solution injected from the injection nozzle 12 is controlled by a DCU (Dosing Control Unit) 20 via the supply module 17. The DCU 20 is connected to an ECU (Engine Control Unit), estimates an engine speed—load from the ECU and a quantity of generated NOx from an exhaust gas temperature sensor 21 provided on an upstream side of the exhaust pipe 10, and determines a quantity of aqueous urea solution necessary to denitrate the NOx and controls the supply module 17 based on the determined quantity of aqueous urea solution. Furthermore, when injection is performed by the injection nozzle 12 at the determined quantity of aqueous urea solution, the DCU 20 controls the supply module 17 based on a detected value of an NOx sensor 22 provided on an upstream side of the exhaust pipe 10 to adjust the quantity of the aqueous urea solution injected from the injection nozzle 12.

Meanwhile, a concentration/level sensor 23 that detects a concentration and a level of the aqueous urea solution 15 is provided in the urea tank 16, and a detected value of the concentration/level sensor 23 is inputted to the DCU 20.

While the concentration/level sensor 23 basically measures a level and a concentration by a variation in capacitance, the concentration/level sensor 23 is capable of simultaneously measuring electrical conductance to detect incorporation of a saline solution or the like. The concentration/level sensor 23 may be constructed so as to integrate a level sensor and a concentration sensor as illustrated, or may be constituted by independent sensors that respectively detect level and concentration.

The DCU 20 is arranged so as to diagnose the quality of the aqueous urea solution 15 based on detected values of level and concentration from the concentration/level sensor 23.

In the quality diagnosis, an abnormal concentration is diagnosed when a detected value of concentration by the concentration/level sensor 23 is equal to or higher than an upper limit value $\beta$ that is an upper limit of the concentration of the aqueous urea solution or equal to or lower than a lower limit value $\alpha$ that is a lower limit of the concentration of the aqueous urea solution, whereby injection of the aqueous urea solution by the supply module 17 is prohibited. In addition, through the ECU, a warning lamp provided in a cabin is turned on or an audible alarm is sounded with a buzzer in order to warn an operator regarding the prohibition and to prompt replacement of the aqueous urea solution 15 in the urea tank 16 with a normal aqueous urea solution.

In the quality diagnosis according to the present invention, a level L of the aqueous urea solution detected by the concentration/level sensor 23 is judged before performing a diagnosis based on a detected value of concentration, whereby a diagnosis based on a detected value of concentration is not performed when the level L is equal to or lower than a predetermined value.

In other words, when the level is low, a vibration of a vehicle or the like causes a liquid surface to sway and exposes a detecting element of the sensor 23, and signal detection becomes unstable and a concentration can no longer be accurately detected. Therefore, a diagnosis based on a detected value of concentration is performed when the level is equal to or higher than a predetermined level that enables the concentration/level sensor 23 to accurately detect a concentration. As described above, by performing a diagnosis in a state where the level of the aqueous urea solution during the diagnosis is secured, concentration can be detected in a highly reliable manner.

Figure 2:
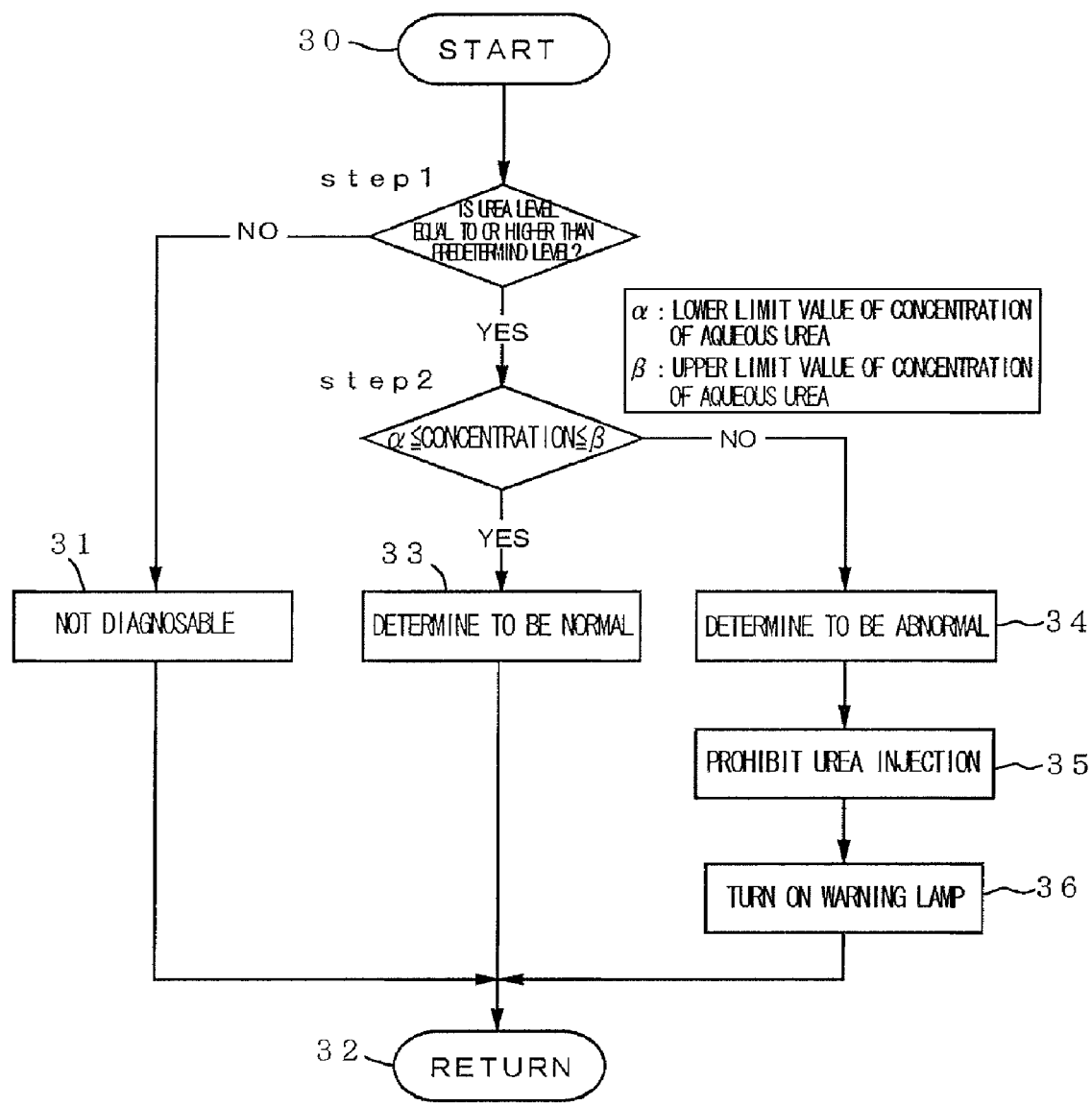
FIG. 2 is a diagram showing a flow of a urea quality diagnosis system according to the present invention.

Next, a flow of the urea quality diagnosis system according to the present invention will be described with reference to FIG. 2.

A diagnosis is started 30 in step 1 by determining whether or not an aqueous urea solution is equal to or higher than a predetermined level. When the level of the aqueous urea solution is lower than the predetermined value (NO) in step 1, a judgment of not diagnosable 31 is made and the diagnosis is terminated (return) 32. When the level of the aqueous urea solution is equal to or higher than the predetermined value (YES) in step 1, in step 2, a determination is made on whether or not a detected concentration is equal to or higher than a lower limit value $\alpha$ and equal to or lower than an upper limit value $\beta$. If $\alpha \leq$ concentration $\leq \beta$ (YES), a determination of normal 33 is made, and if the concentration is lower than the lower limit value $\alpha$ or higher than the upper limit value $\beta$ (NO), a determination of abnormal 34 is made, whereby urea injection is prohibited 35 and the warning lamp is turned on 36. Subsequently, the diagnosis is terminated 32.

What is claimed is:

1. An urea quality diagnosis system which judges a level of an aqueous urea solution prior to a diagnosis based on a detection of a concentration of the aqueous urea solution in a urea tank, which does not diagnose a quality of the aqueous urea solution when the level is lower than a predetermined value, and which diagnoses the quality of the aqueous urea solution based on a detected value of the concentration of the aqueous urea solution when the level is equal to or higher than the predetermined value.

2. The urea quality diagnosis system according to claim 1, wherein a detection of the concentration of the aqueous urea solution is not performed by a sensor when the level is lower than the predetermined value and the sensor cannot detect the accurate concentration of the aqueous urea solution, a detection of the concentration of the aqueous urea solution is performed when the level is equal to or higher than the predetermined value so as to accurately detect the concentration of the aqueous urea solution, and a diagnosis of an abnormal concentration is established when the detected value of the concentration of the aqueous urea solution is equal to or higher than an upper limit of the concentration of the aqueous urea solution or equal to or lower than a lower limit of the concentration of the aqueous urea solution.

3. The urea quality diagnosis system according to claim 1, wherein when a diagnosis of an abnormal concentration is established, injection of urea is prohibited and a warning of the prohibition is issued to an operator.

4. The urea quality diagnosis system according to claim 2, wherein when a diagnosis of an abnormal concentration is established, injection of urea is prohibited and a warning of the prohibition is issued to an operator.

* * * * *